United States Patent
Shibuya (10) Patent No.: US 8,696,767 B2
(45) Date of Patent: Apr. 15, 2014

(54) DIPPING METHOD OF FORMING CATHODE OF SOLID ELECTROLYTIC CAPACITOR

(75) Inventor: Yoshinori Shibuya, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 659 days.

(21) Appl. No.: 12/601,466

(22) PCT Filed: May 20, 2008

(86) PCT No.: PCT/JP2008/059184
§ 371 (c)(1),
(2), (4) Date: Nov. 23, 2009

(87) PCT Pub. No.: WO2008/143234
PCT Pub. Date: Nov. 27, 2008

(65) Prior Publication Data
US 2010/0172067 A1 Jul. 8, 2010

(30) Foreign Application Priority Data

May 21, 2007 (JP) ................................. 2007-134579

(51) Int. Cl.
*H01G 9/025* (2006.01)

(52) U.S. Cl.
USPC .......................... 29/25.03; 29/25.42; 361/525

(58) Field of Classification Search
USPC ............... 29/25.35–25.42, 592.1, 832, 25.03; 361/321.1, 311, 523–528; 438/238–239
See application file for complete search history.

(56) References Cited

U.S. PATENT DOCUMENTS

| | | | |
|---|---|---|---|
| 3,864,219 A | 2/1975 | Dosch et al. | |
| 6,249,424 B1 * | 6/2001 | Nitoh et al. | 361/523 |
| 6,351,370 B1 * | 2/2002 | Konuma et al. | 361/523 |
| 6,731,497 B2 * | 5/2004 | Yokouchi et al. | 361/525 |
| 6,813,141 B2 * | 11/2004 | Kuroyanagi | 361/533 |
| 6,867,088 B2 * | 3/2005 | Sakai et al. | 438/239 |
| 6,890,363 B1 * | 5/2005 | Sakai et al. | 29/25.03 |
| 6,954,351 B2 * | 10/2005 | Konuma et al. | 361/523 |
| 7,175,781 B2 * | 2/2007 | Konuma et al. | 252/500 |
| 7,713,466 B2 * | 5/2010 | Omori et al. | 419/2 |
| 2003/0174461 A1 | 9/2003 | Takatani et al. | |
| 2005/0278915 A1 * | 12/2005 | VanNatta et al. | 29/25.03 |
| 2010/0172067 A1 * | 7/2010 | Shibuya | 361/523 |

FOREIGN PATENT DOCUMENTS

| | | |
|---|---|---|
| CN | 1447360 A | 10/2003 |
| JP | 50-100570 A | 8/1975 |
| JP | 50-102861 A | 8/1975 |
| JP | 2000-100666 A | 4/2000 |
| JP | 2001-110681 A | 4/2001 |

(Continued)

*Primary Examiner* — Minh Trinh
(74) *Attorney, Agent, or Firm* — Sughrue Mion, PLLC (57) ABSTRACT

The present invention relates to a method to produce a solid electrolytic capacitor by forming a dielectric layer on an anode body comprising a valve-acting metal sintered body having fine pores and forming on the dielectric layer a conductive compound layer to form a cathode, wherein a cathode is formed by repeating the step of dipping the anode body into an inorganic compound solution, an organic compound solution or a conductive-polymer compound dispersion liquid which turns into a conductive compound layer to thereby laminate a conductive layer on the anode body, and the depth of the anode body to be dipped is increased with each dipping; and an apparatus to be used for the method. According to the present invention, a satisfactory cathode layer can be efficiently formed and a solid electrolytic capacitor having a large capacitance and a low equivalent series resistance can be produced.

8 Claims, 2 Drawing Sheets

(56) References Cited

FOREIGN PATENT DOCUMENTS

| | | |
|---|---|---|
| JP | 2001-155966 A | 6/2001 |
| JP | 2001-338845 A | 12/2001 |
| JP | 2003-109581 A | 4/2003 |
| JP | 2003-197490 A | 7/2003 |
| JP | 2005-109252 A | 4/2005 |
| JP | 2006-310365 A | 11/2006 |
| WO | 2006/132141 A1 | 12/2006 |

* cited by examiner

DIPPING METHOD OF FORMING CATHODE OF SOLID ELECTROLYTIC CAPACITOR

TECHNICAL FIELD

The present invention relates to a method for producing a solid electrolytic capacitor, a capacitor obtained by the method and an apparatus for producing the same. Specifically, the present invention relates to a method to produce a solid electrolytic capacitor by forming a dielectric layer on an anode body comprising a valve-acting metal sintered body having fine pores and forming on the dielectric layer a conductive compound layer to serve as a cathode, wherein the distance (depth) of dipping is increased with each dipping of the valve-acting metal sintered body into an inorganic compound solution, an organic compound solution or a conductive-polymer compound dispersion liquid which turns into a conductive compound layer so that the apertures on the surface of the sintered porous body may not be completely closed to thereby makes it possible to form a cathode efficiently by delivering the solution to the depth until a conductive compound layer is sufficiently formed; a solid electrolytic capacitor obtained by the method; and an apparatus for producing a solid liquid layer provided with a dipping device using a solution or a dispersion liquid which turns into a conductive compound layer.

BACKGROUND ART

An aluminum solid electrolytic capacitor or a tantalum solid electrolytic capacitor is known as a capacitor having high capacitance and low ESR (equivalent series resistance) to be used for various electronics.

A solid electrolytic capacitor is fabricated by encapsulating a solid electrolytic capacitor element comprising one electrode (anode body) made from an aluminum foil having fine pores on the surface layer or a sintered body of tantalum powder or niobium powder having fine pores inside; a dielectric layer formed on the surface layer of the electrode; the other electrode (cathode, which is usually a semiconductor layer) provided on the dielectric layer; and an electrode layer laminated on the other electrode. In cases of anode bodies of the same volume, the smaller the fine pores there are and the more fine pores there are in the anode body, the surface area inside the anode body becomes larger, resulting in the higher capacitance produced from the anode body.

The dielectric layer is formed by an electrochemical method so-called chemical formation. Examples include a method of forming the dielectric layer by dipping a conductor layer in an electrolytic solution in which mineral acid such as phosphoric acid and sulfuric acid or salt thereof, or organic acid such as acetic acid, adipic acid, benzoic acid or salt thereof is dissolved; and by applying a predetermined voltage between the conductor layer as an anode and the cathode separately provided in the electrolytic solution.

JP-A-S50-100570 publication (Patent Document 1; U.S. Pat. No. 3,864,219) discloses the chemical formation in an electrolytic solution using quaternary ammonium salts. JP-A-S50-102861 publication (Patent Document 2) discloses the chemical formation using an electrolytic solution of boric acid and the like.

A conductive organic compound or inorganic compound can be used as a cathode, but a conductive polymer is preferably used in view of the heat resistance and low ESR property of the capacitor produced thereof. The conductive polymer means a polymer having conductivity as high as $10^{-2}$ to $10^3$ $S \cdot cm^{-1}$ which exerts high conductivity by adding an electron-donating compound so-called a dopant to a polymer having a conjugated double bond (which is generally an insulating polymer or a polymer having an extremely low conductivity). One of the specific examples of forming a conductive polymer layer as a cathode is a method of polymerizing the monomer which can be turned into a conductive polymer in the above-mentioned fine pores of the anode body in the presence of dopant by supplying thereto an appropriate oxidizing agent or electrons. The dopant taken in when the monomer is polymerized produces a strong interaction with the polymer having a conjugated double bond, and thereby a conductive polymer is obtained.

In production methods of solid electrolytic capacitors, the operation of impregnating an anode body comprising valve-acting metal on which a dielectric film is formed with a solution for forming a cathode such as manganese nitrate solution, conductive monomer solution and conductive polymer dispersion liquid is known technique.

However, in the method the cathode-forming solution penetrates inside the anode body through capillarity using that the anode body made of valve-acting metal is a porous body, and the method cannot be directly applied in the cases where the solution is a low-temperature or high-concentration solution having high viscosity. Also, in the conventional method for impregnating the anode body with manganese using a manganese nitrate solution, it has been a usual method to raise the concentration of the impregnating solution with each dipping and it has been necessary to use a diluted solution in the initial dipping, and the number of times and the period cannot have been reduced.

For example, JP-A-2001-338845 publication (Patent Document 3) and JP-A-2001-155966 publication (Patent Document 4) show a method for forming a conductive polymer compound as a cathode material on an aluminum formation foil. However, the penetration depth of the cathode-formation solution to go deep into the foil becomes physically shallower when an aluminum foil is used compared to the case where a powder sintered body is used. Therefore the method to be used for an aluminum formation foil is not suitable for a powder sintered body having deep fine pores in which the penetration depth for the cathode-forming solution to go should be greater.

Also, a method for conducting the impregnating step under pressure has been suggested.

JP-A-2001-110681 publication (Patent Document 5) suggests a method for forcing the cathode-forming solution to penetrate into an aluminum formation foil by applying pressure. However, the penetration depth is also shallow as in the above-mentioned method. Also, considerable amount of the compressed atmosphere remains in the depth of pores. Since the anode body comprising powder sintered body having deep pores has difficulty in deaerating the atmosphere such as air as in being impregnated with the cathode-forming solution, the anode body is vulnerable to damages of the cathode material and a dielectric body due to the expansion of gas inside the sintered body when subjected to the heat by drying and the heat distortion after the recovery from the thermal injury by the application of voltage.

A method of impregnating a powder sintered body has also been suggested.

For example, JP-A-2005-109252 publication (Patent Document 6) describes a method for forming a polymer compound by impregnating an anode body with an organic compound solution and further impregnating the anode body with a conductive polymer dispersion liquid. In this case, an anode body wherein the tantalum powder capacitance is 40,000 µFV/g is used; and the apertures on the surface of the anode body have relatively large diameter in general and the average diameter of fine pores exceeds 0.5 μm. Therefore, the width of the ingress channel for the cathode-forming agent is large and there is no hindrance in forming a cathode. However, when fine tantalum powder: e.g. powder of having capacitance of 70,000 μFV/g is used, the apertures on the surface of the anode body become smaller and the average pore diameter becomes smaller than 0.5 μm, which makes the ingress channel relatively narrower. In the anode body having such a form, the cathode-forming solution cannot sufficiently penetrate inside the anode body.

Furthermore, with respect to the powder sintered body, a method for conducting the impregnating step under reduced pressure has been suggested.

Specific examples include JP-A-2006-310365 publication (Patent Document 7). However, when an anode body is impregnated with a cathode-forming agent using the method and the average diameter of fine pores becomes less than 0.5 μm, the cathode-forming agent penetrates into the anode body by impregnation under reduced pressure, but the cathode becomes readily formed in the course of volatilization of a solvent during thermal decomposition and drying and, in particular, a cathode is to be selectively formed at the apertures which are the point where the evaporation occurs: i.e. on the surface of the anode body. When the cathode is formed on the surface of the anode body, the fine pores in the vicinity become closed and make it difficult for the cathode-forming agent to penetrate inside the anode body.

This tendency can be commonly seen any anode body in principle, but is particularly pronounced when the average diameter of fine pores in the anode body composed of valve-acting metal is 0.5 μm or less. When the valve-acting metal of the anode body is tantalum powder having capacitance of 70,000 μFV/g or more or niobium powder having capacitance of 130,000 μFV/g or more, it is observed that fine pores on the surface of the anode body are closed. Particularly, the penetration depth of the impregnation solution becomes greater when one side of the sintered body exceeds 1 mm, and the cathode formation inside the anode body becomes incomplete when the closed pores on the surface are observed. In such conditions, a channel for newly supplying a cathode-forming agent is cut off and therefore the solid electrolytic capacitor thereof cannot deliver high performance.

It might be possible to make the cathode-forming solution diluted to prevent the fine pores near the surface of the anode body from being closed at the time of forming a cathode. However, the number of times for impregnation must be increased in this case and therefore the method cannot be considered an efficient method. Also, the prolonged operation time increases the chance of damaging the capacitor element due to the heat at the time of drying.

[Patent Document 1] JP-A-S50-100570 publication
[Patent Document 2] JP-A-S50-102861 publication
[Patent Document 3] JP-A-2001-338845 publication
[Patent Document 4] JP-A-2001-155966 publication
[Patent Document 5] JP-A-2001-110681 publication
[Patent Document 6] JP-A-2005-109252 publication
[Patent Document 7] JP-A-2006-310365 publication

DISCLOSURE OF INVENTION

Problems to be Solved by the Invention

An objective of the present invention is to provide a method for producing a solid electrolytic capacitor, wherein the distance (depth) of dipping is increased with each dipping of a porous body composed of valve-acting metal and the like into a cathode-forming solution so that the apertures on the surface of the sintered porous body may not be completely closed to thereby make it possible to form a cathode efficiently by delivering the solution to the depth until a cathode layer is sufficiently formed; and an apparatus to be used in the method; and, as a result, to provide a method for producing a solid electrolytic capacitor having high capacitance and low equivalent series resistance, and an apparatus to carry out the method.

Means to Solve the Problem

As a result of intensive study on the problems of the prior art, the present inventors have found that even in cases where an anode body uses a sintered body of fine powder having high capacitance, in particular, a sintered body in which the average diameter of fine pores is 0.5 μm or less, the cathode formation can be completed by impregnation of a cathode-forming solution deeper inside the anode body without closing fine pores on the surface of the porous body with the impregnation solution in carrying out the impregnation operation. That is, the present inventors have found that, in a method for producing a solid electrolytic capacitor by forming a dielectric layer on an anode body comprising a valve-acting metal sintered body, particularly, in which an average diameter of fine pores is 0.5 μm or less, and forming on the dielectric layer a (conductive) compound layer to serve as a cathode, a cathode can be efficiently formed by increasing the distance (depth) of dipping with each dipping of the valve-acting metal sintered body into an inorganic compound solution, an organic compound solution or a conductive-polymer compound dispersion liquid which turns into a conductive compound layer so that the apertures on the surface of the sintered porous body may not be completely closed; and by delivering the solution to the depth until a cathode layer is sufficiently formed. The present invention has been completed based on this finding.

The present invention is to provide a method for producing a solid electrolytic capacitor; a solid electrolytic capacitor; and an apparatus for producing a solid electrolytic capacitor as described in 1 to 13 below:

1. A method for producing a solid electrolytic capacitor characterized in that,
in a method for producing a solid electrolytic capacitor by forming a dielectric layer on an anode body comprising a valve-acting metal sintered body having fine pores and forming on the dielectric layer a conductive compound layer to form a cathode,
when a cathode is formed by repeating the step of laminating a conductive compound layer on an anode body by dipping the anode body into an inorganic compound solution, an organic compound solution or a conductive-polymer compound dispersion liquid which turns into a conductive compound layer,
the range of the anode body to be dipped in the solution or dispersion liquid is increased with each dipping.
2. The method for producing the solid electrolytic capacitor as described in 1 above, wherein the average diameter of fine pores of the valve-acting metal sintered body is 0.5 μm or less.
3. The method for producing the solid electrolytic capacitor as described in 1 above, wherein the time of each dipping in the solution or dispersion liquid is the sufficient time for the solution or dispersion liquid to penetrate inside the valve-acting metal sintered body by capillarity.

4. The method for producing the solid electrolytic capacitor as described in 3 above, wherein the time of each dipping in the solution or dispersion liquid is from one to ten minutes.
5. The method for producing the solid electrolytic capacitor as described in any one of 1 to 4 above, wherein a cathode is formed by repeating the step of dipping the anode body in the solution or dispersion liquid multiple times under reduced pressure and subsequent heat decomposition or drying.
6. The method for producing the solid electrolytic capacitor as described in any one of 1 to 4 above, wherein a cathode is formed by repeating the step of dipping the anode body in the solution or dispersion liquid multiple times under atmospheric pressure and subsequent heat decomposition or drying.
7. The method for producing the solid electrolytic capacitor as described in 1 above, wherein the valve-acting sintered body is a sintered body of powder selected from tantalum powder, niobium powder, alloy powder mainly comprising tantalum, alloy powder mainly comprising niobium and niobium monoxide powder.
8. A solid electrolytic capacitor produced by a method as described in any one of 1 to 7 above.
9. An apparatus for carrying out the method for producing a solid electrolytic capacitor described in any one of 1 to 7 above, provided with a dipping device comprising a means (1) to cut off the outside air to reduce the internal pressure; a sealed tank which contains in its interior: an anode-body holder (2) to fasten the anode body, a tank (3) of a cathode-forming agent solution, and an elevating means (4) to moves up and down the above-mentioned anode-body holder (2) or the tank (3) of a cathode-forming agent solution; and a means (5) to regulate temperature of the above-mentioned tank (3) of a cathode-forming agent solution.
10. The apparatus as described in 9 above, wherein (3) the tank of the cathode-forming agent solution has a jacketing structure which enables temperature regulation to prevent the temperature change in the solution due to the latent heat of evaporation under reduced pressure.
11. The apparatus as described in 9 above, wherein the anode-body holder (2) is fixed at a position and the tank of the cathode-forming agent solution (3) is placed on the elevating device (4).
12. The apparatus as described in 9 above, wherein the tank of the cathode-forming agent solution (3) is fixed at a position and the anode-body holder (2) is joined to the elevating device (4).
13. The apparatus as described in any one of 9 to 12 above, provided with a means for detecting distance to make it possible to detect the distance between the cathode-forming solution tank (3) and the anode-body holder (2) to control the penetration distance.

Effects of the Invention

The present invention is to provide, in a method for producing a solid electrolytic capacitor by forming a dielectric layer on an anode body comprising a valve-acting metal sintered body having particularly fine pores and forming on the dielectric layer a conductive compound layer (for example, a layer obtained by impregnation of an organic compound solution, an organic compound solution or a conductive polymer dispersion liquid followed by heating), a method for producing a solid electrolytic capacitor, wherein the distance (depth) of dipping is increased with each dipping of a porous body composed of valve-acting metal and the like into an inorganic compound solution, an organic compound solution or a conductive polymer compound dispersion liquid which turns into a conductive compound layer so that the apertures on the surface of the sintered porous body may not be completely closed to thereby makes it possible to form a cathode efficiently by delivering the solution to the depth until a cathode layer is sufficiently formed; and an apparatus to be used for the method (a dipping apparatus of a solution or a dispersion liquid which turns into a cathode compound layer).

According to the present invention, a cathode layer can be formed efficiently in the anode body comprising a valve-acting metal sintered body having fine pores and, as a result, a solid electrolytic capacitor having high capacitance and low ESR (equivalent series resistance) can be produced.

BRIEF DESCRIPTION OF DRAWINGS

FIGS. 2(*a*)-2(*d*) illustrate sequential dipping operations in accordance with the method of the present invention, where the depth to which an anode body 11 is dipped into a cathode forming agent solution 12 is increased by 0.2 mm with each dipping. Particularly, FIG. 2(*a*) shows the anode body 11 dipped to a depth of 0.2 mm, FIG. 2(*b*) shows dipping to a depth of 0.4 mm in a second dipping step which includes newly dipped part 13, FIG. 2(*c*) shows a depth of dipping the anode body 11 at the $N^{th}$ time, and FIG. 2(*d*) shows a depth of dipping the anode body 11 at the $(N+1)^{th}$ time.

EXPLANATION OF REFERENCE NUMERALS

1 pressure reducing means
2 anode-body holder
3 tank of the cathode-forming agent solution
4 elevating device
5 temperature regulating means
10 dipping device
11 anode body
12 cathode forming agent solution
13 newly dipped part of anode body

BEST MODE TO CARRY OUT THE INVENTION

Examples of the sintered body used in the present invention include a sintered body having numerous fine pores inside which is obtained by molding and then sintering powder such as tantalum powder, niobium powder, alloy powder mainly comprising tantalum, alloy powder mainly comprising niobium and niobium monoxide powder. In the case of these sintered body, an outgoing lead can be directly connected to the sintered body. Also, in a case where a powdery conductor is molded or sintered after molded, a part of a separately-prepared outgoing lead (or a lead foil) may be molded together with the powder at the time of molding and thus the other part of the outgoing lead (or a lead foil) outside the molded body may be used as outgoing lead of one electrode in the solid electrolytic capacitor element. It is also possible to leave a part of the sintered body without forming a cathode layer thereon to be used as an anode part.

Specific examples of an inorganic compound solution which turns into a cathode compound layer in the present invention include a solution of various metal salts which can form one member of molybdenum dioxide, tungsten dioxide, zinc dioxide, manganese dioxide and the like.

Examples of an organic compound solution include an alcohol solution, ketone solution or ester solution of furan, pyrrole, thiophene, aniline or a substituted derivative thereof.

Examples of a polymer compound dispersion liquid include a dispersion liquid of polyaniline, polyoxyphenylene, polyphenylene sulfide, polythiophene, polyfuran, polypyrrole, polymethylpyrrole, and a substitution derivative and a copolymer thereof. Among these, preferred is a dispersion liquid of polypyrrole, polythiophene and a substitution derivative thereof (e.g., poly(3,4-ethylenedioxythiophene)).

When the above-mentioned compound layer (an inorganic semiconductor or an organic semiconductor layer) has an electric conductivity of $10^{-2}$ to $10^3$ S·cm$^{-1}$, the solid electrolytic capacitor produced can have a small ESR value and this is preferred.

The present invention enables a cathode-forming solution to penetrate inside the anode body until a cathode is sufficiently formed by controlling the depth of dipping the anode body into a solution of a cathode-forming agent in the impregnation operation so as to always keep a new part of the anode body involved in the impregnation even if closed fine pores appear in some part of the surface.

Figure 1:
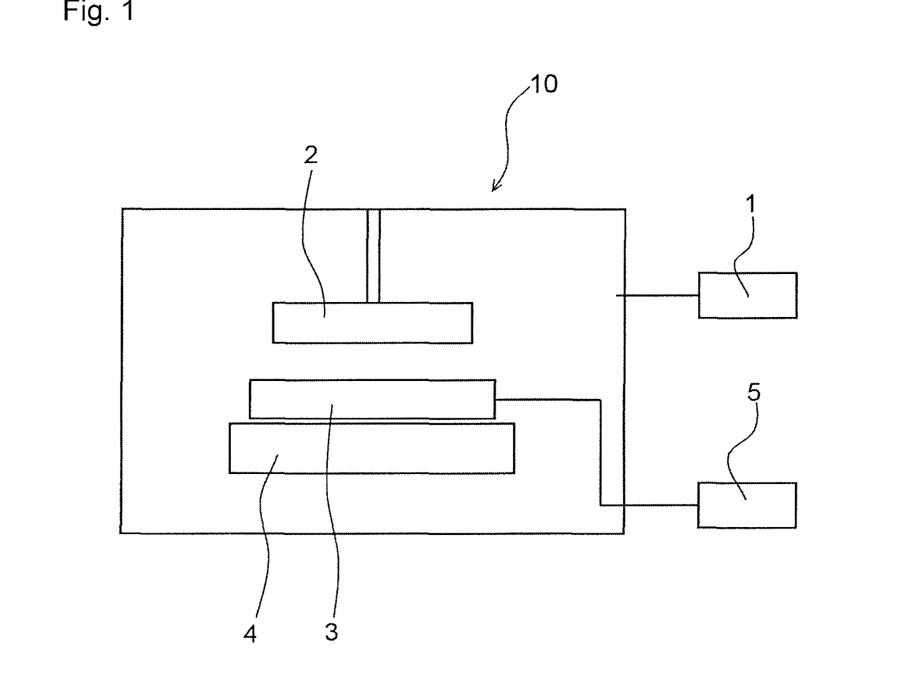
FIG. 1 is a schematic view showing the concept of the device used for the method for producing the solid electrolytic capacitor of the present invention.

FIG. 1 shows a schematic figure showing the concept of one example of such a dipping apparatus. FIG. 1 is a schematic figure of the apparatus of the present invention to carry out the impregnation operation. The apparatus (10) comprises a sealed tank which is preferably capable of reducing the internal pressure and contains in its interior an anode-body holder (2) to fasten the anode body; a tank of the cathode-forming agent solution (3) which allows the temperature control; and the elevating device (4) to move up and down the cathode-forming solution tank (3); the tank of the cathode-forming agent solution (3) is provided with a temperature regulating means (5) and a means to move up and down the tank (4), which are designed to make the temperature regulation and the elevation of the cathode-formation tank (3) controllable from outside the sealed tank.

In FIG. 1, the dipping device (10) is joined to a pressure reducing means (1) to reduce the pressure inside the sealed tank (e.g. a vacuum pump), and the anode-body fastening device has a structure which is capable of fixing and holding the anode-body holder (2), for example, at a given position. The tank of the cathode-forming agent solution (3) preferably has a jacket structure which withstands reduced pressure (reduced pressure without boiling the solution or dispersion medium) and enables the temperature regulation to prevent the temperature change due to the latent heat of evaporation under reduced pressure.

The tank of cathode-forming solution tank (3) is generally placed on the elevation device (4), and is preferably provided with a distance-detection means (not shown in the FIGURE) which can detect the distance between the device for fastening the anode body (holder) (2) and the cathode-forming solution in order to control the penetration distance with accuracy.

Though the above example shows a device provided with a device for fastening the anode body (holder) (2), an embodiment in which the tank of the cathode-forming solution is fixed at a given position while the anode-body holder is moved up and down can also be employed.

The penetration distance is controlled, e.g. in the case where ten times of impregnating is employed, so as to increase the penetration distance by one-tenth of the depth of the anode body to be used per each impregnation. As to the means to detect the distance between the device for fastening the anode body (holder) (2) and the cathode-forming solution, a position sensor such as a laser sensor allows easier control of the distance, but the means are not limited thereto. Also, the whole apparatus needs adequate mechanical strength to be maintained at reduced pressure at the time of impregnation and to return to normal pressure when pulling the anode body out of the impregnation solution.

It is preferable that the degree of reduction in pressure inside the sealed tank is controllable depending on the vapor pressure of the solvent of the cathode-forming solution. For example, in the case of the operation using an aqueous solution or dispersion liquid at room temperature, reduction in pressure to about 30 kPa is enough so as not to allow the solvent to boil. Therefore, a common vacuum pump, aspirator and the like can be used as a pressure reducing means, but it is not limited thereto.

Figure 2A:
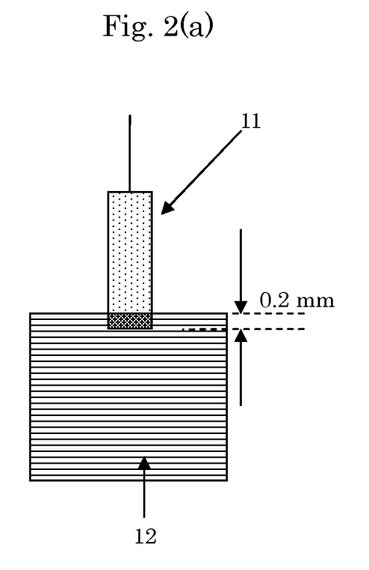

The impregnation operation carried out using the device is available regardless of the kinds of the anode body and the cathode impregnation solution. For example, in the case where an anode body in a size of 1.3×2×2 mm (having an anode wire on the face of 1.3×2 mm) produced by molding and sintering a tantalum powder having CV of 70,000 μF·V/g and subsequent chemical formation treatment is dipped in a conductive polymer dispersion liquid ten times, the impregnation solution is put into the impregnating tank of the above-mentioned impregnating device; and pressure on the anode-body fastening device is reduced to 30 kPa. Subsequently, the anode body is dipped and kept at 0.2 mm below the dispersion liquid surface for a certain period of time (one minute or more, preferably from three minutes or more to ten minutes or less) until the solution penetrates by capillarity; and the dipping device is restored to normal pressure. When the anode body is pulled out of the dispersion liquid, a liquid film appears on the anode body surface to a depth of 0.2 mm which was in contact with the impregnating dispersion liquid, but the portion of the anode body above the liquid film can be impregnated without exuding of the cathode-forming solution to the surface of the anode body. After the subsequent drying, the first impregnating operation is completed. At this time, the cathode-forming agent excessively attached to the anode body surface is deposited in the portion of the anode body in which a liquid film is formed, in which portion a cathode is preferentially formed and part of the apertures of fine pores are closed.

Figure 2B:
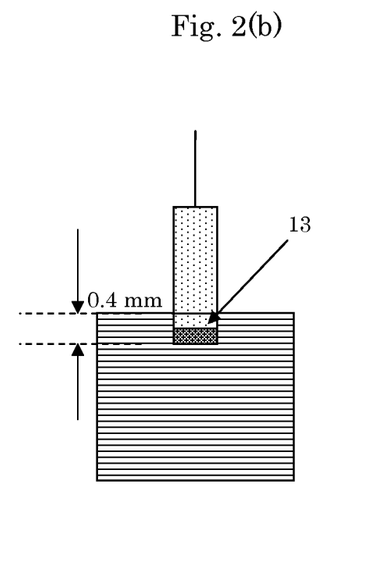

Next, the operation is carried out in the same way except that the penetration depth is increased by 0.2 mm up to 0.4 mm. Then, in addition to the portion of the anode body in which a liquid film was formed and some of the apertures are closed in the previous operation, the anode body is newly exposed to the impregnating solution in the portion of the increased 0.2 mm depth. Since there is no part having closed apertures in the portion, the portion becomes a new ingress for the cathode-forming agent and forms a new channel inside the anode body to thereby enable the penetration of the solution by capillarity in the same way as in the previous operation. After the anode body was dipped in the solution for a certain period of time, the similar operation is carried out to complete the second impregnation.

Figure 2C:
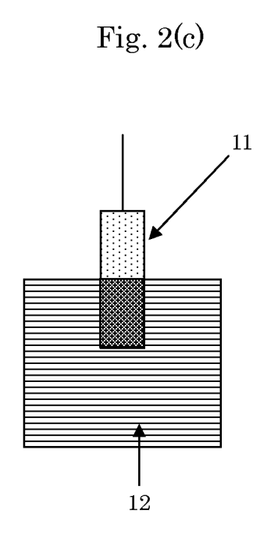
Figure 2D:
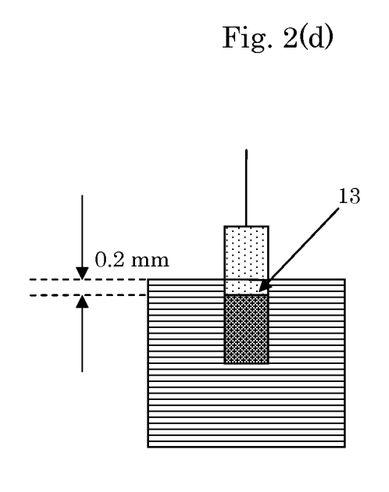

The operation is carried out with increase in the depth by 0.2 mm in each dipping so that the whole element is ultimately dipped in the solution by ten times of dipping.

After the whole element is dipped in the solution, it is preferable to close fine pores on the surface of the anode body intentionally to lead out the cathode. Though the same cathode-forming solution may be used to carry out the operation, the dispersion liquid having a higher concentration of polymer particles of a large diameter can be used. Furthermore, a cathode for a solid electrolytic capacitor can be led out by subsequent steps and methods such as applying carbon paste, applying silver paste and bonding of the lead frame.

The number of impregnating may be increased or decreased depending on the volume of the anode body, the concentration, viscosity and temperature of the impregnating solution and the like and therefore is not limited to ten times as described above. The basic operation can be conducted regardless of the kinds of the anode body and the impregnating solution.

EXAMPLE

The present invention is described in greater detail below by specifically referring to Examples, but the present invention is not limited to these Examples.

Example 1

Commercial niobium powder for a capacitor having nominal capacitance of 200,000 μF·V/g was sintered with a niobium wire to thereby produce a molded body of about 20 mg in a size of 2×2×1.4 mm. The molded body was subjected to heat treatment at 1250° C. under <4×10 cm$^{-3}$ Pa for 30 minutes to obtain a sintered body. By conducting chemical formation treatment of the obtained sintered body in a 1% phosphoric acid aqueous solution at 80° C. for 300 minutes by applying 30 V, a dielectric layer was formed on the surface of the sintered body to produce an anode body. The anode body had a capacitance of 132 μF in 30% sulfuric acid solution and an average pore diameter of 0.32 μm measured by mercury intrusion.

20 units of the anode body were welded to the substrate so that the powder sintered body parts of the anode body lie in a straight line and the substrate was fastened to the holder of the dipping device. An aqueous dispersion liquid of the conductive polymer (poly-(3,4-ethylenedioxythiophene)) having an average particle diameter of 20 nm, which was adjusted to have a solid content of 1.1% and viscosity of 30 mPa/s, was prepared to fill the jacketed dipping tank of the decompression dipping device. The device was sealed and the inside pressure was reduced to 0.05 Pa using a vacuum pump.

Next, the dipping tank was moved to a position where the bottom faces of the elements came to 0.1 mm below liquid surface to conduct dipping. The anode bodies were kept for five minutes until the dispersion liquid penetrates into the whole electrochemically formed product, the internal pressure of the device was returned to atmospheric pressure and the dipping tank was put back to the original position. The anode bodies were taken out, dried under atmospheric pressure at 120° C. for ten minutes and then naturally cooled to room temperature.

Counting the operation from fastening the anode bodies to the dipping device to drying and cooling the anode bodies as one time, the operation was repeated 20 times while the penetration depth was increased by 0.1 mm for each operation.

Furthermore, dipping was repeated three times with the penetration depth fixed at 2 mm; and after changing the dispersion liquid of the cathode-forming agent with an aqueous dispersion liquid of conductive polymer having an average particle diameter of 1 μm, dipping was performed another two times to completely close the pores on the surface of the anode body. The dipping step comprising 25 times of dipping in total was performed to form a conductive polymer film on the dielectric layer of the anode body. Furthermore, carbon paste and silver paste were applied onto the anode body having a conductive polymer film formed thereon, and anode body was attached to a lead frame and encapsulated with epoxy resin.

The average capacitance at 120 Hz and equivalent series resistance at 10 kHz of 20 units of thus-produced solid electrolytic capacitors are shown in Table 1.

Example 2

20 units of solid electrolytic capacitors were produced by the same operation as in Example 1 except that an aqueous dispersion liquid of conductive polymer (poly-(3,4-ethylenedioxythophene)) having an average particle diameter of 20 nm adjusted to have a solid content of 2.3% and the viscosity of 60 mPa/s was used instead of the aqueous dispersion liquid of conductive polymer (poly-(3,4-ethylenedioxythophene)) having an average particle diameter of 20 nm adjusted to have a solid content of 1.1% and the viscosity of 30 mPa/s. The average capacitance at 120 Hz and equivalent series resistance at 10 kHz of the obtained capacitors are shown in Table 1.

Example 3

A manganese dioxide layer was formed on the dielectric layer of the anode body by the same operation as in Example 1 except that 30% manganese nitrate solution was used instead of the aqueous dispersion liquid of conductive polymer, and the drying was performed under conditions at 200° C. for 25 minutes. Also, at the end of the fifth, tenth, fifteenth, twentieth and twenty-fifth dipping, the step of repairing the damage of the dielectric layer resulting from forming the manganese dioxide layer was added by subjecting the anode body to chemical formation in 1% phosphoric acid solution at 80° C. and 15 V for 30 minutes.

The average capacitance at 120 Hz and equivalent series resistance at 10 kHz of the thus-obtained capacitors are shown in Table 1.

Comparative Example 1

The solid electrolytic capacitor was made in the same way as in Example 1 except that the penetration depth was fixed at 2 mm in all the dipping.

The average capacitance at 120 Hz and equivalent series resistance at 10 kHz of the thus-obtained capacitors are shown in Table 1.

Comparative Example 2

The solid electrolytic capacitor was made in the same way as in Example 2 except that the penetration depth was fixed at 2 mm in all the dipping.

The average capacitance at 120 Hz and equivalent series resistance at 10 kHz of the thus-obtained capacitors are shown in Table 1.

Comparative Example 3

The solid electrolytic capacitor was made in the same way as in Example 3 except that the penetration depth was fixed at 2 mm in all the dipping.

The average capacitance at 120 Hz and equivalent series resistance at 10 kHz of the thus-obtained capacitors are shown in Table 1.

Example 4

The anode bodies were produced, fastened to the holder of the dipping device and placed in the dipping tank; and the dipping tank was filled with a conductive polymer dispersion liquid in the same way as in Example 1.

Next, the dipping tank was moved so that the bottom surface of the capacitor element came to 0.1 mm below liquid surface to conduct dipping. After the dipping tank was kept as it was for five minutes until the dispersion liquid penetrates into the whole electrochemically formed product, the dipping tank was returned to the original position.

The anode body was taken out, dried at 120° C. under atmospheric pressure for ten minutes and then naturally cooled to room temperature.

Counting the operation from fastening the anode body to the dipping device to drying and cooling the anode body as one time, the operation was repeated 20 times while the penetration depth was increased by 0.1 mm for each operation.

Furthermore, dipping was repeated three times with the penetration depth fixed at 2 mm; and after changing the dispersion liquid of the cathode-forming agent with an aqueous dispersion liquid of conductive polymer having an average particle diameter of 1 μm, dipping was performed another two times to completely close the pores on the surface of the anode body. The dipping step comprising 25 times of dipping in total was performed to form a conductive polymer film on the dielectric layer of the anode body.

Furthermore, carbon paste and silver paste were applied onto the anode body having a conductive polymer film formed thereon, and anode body was attached to a lead frame and encapsulated with epoxy resin.

The average capacitance at 120 Hz and equivalent series resistance at 10 kHz of 20 units of thus-produced solid electrolytic capacitors are shown in Table 1.

Example 5

Commercial tantalum powder for a capacitor having nominal capacitance of 70,000 μF·V/g was molded with a niobium wire to thereby produce a molded body of about 35 mg in a size of 2×2×1.4 mm. The molded body was subjected to heat treatment at 1200° C. under <4×10 cm$^{-3}$ Pa for 30 minutes to obtain a sintered body. By conducting chemical formation treatment of the obtained sintered body in a 1% phosphoric acid aqueous solution at 80° C. for 300 minutes by applying 20 V, a dielectric layer was formed on the surface of the sintered body to produce an anode body. The anode body had a capacitance of 119 μF in 30% sulfuric acid solution and an average pore diameter of 0.29 μm measured by mercury intrusion.

20 units of the anode bodies were subjected to impregnation comprising multistage dipping under atmospheric pressure in the same way as in Example 4 to form a conductive polymer film on the dielectric layer of the anode body.

Furthermore, carbon paste and silver paste were applied onto the anode body having a conductive polymer film formed thereon, and anode body was attached to a lead frame and encapsulated with epoxy resin.

The average capacitance at 120 Hz and equivalent series resistance at 10 kHz of 20 units of thus-produced solid electrolytic capacitors are shown in Table 1.

Comparative Example 4

The solid electrolytic capacitor was made in the same way as in Example 4 except that the penetration depth was fixed at 2 mm in all the dipping.

The average capacitance at 120 Hz and equivalent series resistance at 10 kHz of the thus-obtained capacitors are shown in Table 1.

Comparative Example 5

The solid electrolytic capacitor was made in the same way as in Example 5 except that the penetration depth was fixed at 2 mm in all the dipping.

The average capacitance at 120 Hz and equivalent series resistance at 10 kHz of the thus-obtained capacitors are shown in Table 1.

TABLE 1

| | Anode body | Atmosphere | Cathode-forming agent solution | Concentration (mass %) | Capacitance (μF) | Equivalent series resistance (mΩ) |
|---|---|---|---|---|---|---|
| Example 1 | Nb | Reduced pressure | Conductive polymer dispersion liquid | 1.1 | 118 | 40 |
| Example 2 | Nb | Reduced pressure | Conductive polymer dispersion liquid | 2.3 | 114 | 41 |
| Example 3 | Nb | Reduced pressure | Manganese nitrate solution | 30 | 112 | 520 |
| Example 4 | Nb | Atmospheric pressure | Conductive polymer dispersion liquid | 1.1 | 105 | 196 |
| Example 5 | Ta | Atmospheric pressure | Conductive polymer dispersion liquid | 1.1 | 98 | 184 |
| Comparative Example 1 | Nb | Reduced pressure | Conductive polymer dispersion liquid | 1.1 | 81 | 84 |
| Comparative Example 2 | Nb | Reduced pressure | Conductive polymer dispersion liquid | 2.3 | 64 | 140 |
| Comparative Example 3 | Nb | Reduced pressure | Manganese nitrate solution | 30 | 91 | 1200 |
| Comparative Example 4 | Nb | Atmospheric pressure | Conductive polymer dispersion liquid | 1.1 | 37 | 481 |

TABLE 1-continued

|  | Anode body | Atmosphere | Cathode-forming agent solution | Concentration (mass %) | Capacitance (μF) | Equivalent series resistance (mΩ) |
|---|---|---|---|---|---|---|
| Comparative Example 5 | Ta | Atmospheric pressure | Conductive polymer dispersion liquid | 1.1 | 31 | 521 |

Compared to the capacitance of the anode body in 30% sulfuric acid solution, the capacitor has a lower capacitance in Comparative Examples 4 and 5. The capacitor in Comparative Examples 4 and 5 has also higher equivalent series resistance. It is thought to be due to insufficient formation of a cathode in fine pores since the pores of the used anode body were too fine.

However, the capacitors of Examples 4 and 5 produced by multistep dipping had a capacitance near to that of the anode body in 30% sulfuric acid solution and lower equivalent series resistance. That is, according to the method of the present invention, a cathode can be formed sufficiently even in an anode body having fine pores.

When multistep dipping is performed under reduced pressure as in Example 1, the obtained capacitor can attain a capacitance even closer to that in 30% sulfuric acid solution and lower equivalent series resistance. As can be seen from Comparative Example 1, though a higher capacitance can be attained if multistep dipping is performed under reduced pressure in a conventional method, it is not up to the capacitance in Example 4 where the multistep dipping is performed under atmospheric pressure.

Comparison of Comparative Examples 1 and 3 shows that both of the capacitance and equivalent series resistance deteriorate if the solution of the cathode-forming agent has a higher concentration. On the other hand, comparison of Examples 1 and 2 where multistep dipping was performed show that the concentration of the solution has a very small effect on the capacitance and equivalent series resistance.

Also, as seen in Example 3 and Comparative Example 3, even if an inorganic compound (nitrate manganese) was used as a cathode-forming agent, performing multistep dipping makes it possible to attain higher capacitance and lower equivalent series resistance. Generally, the cathode using nitrate manganese (manganese dioxide cathode) has higher equivalent series resistance than the cathode made of poly-(3,4-ethylenedioxythiophene).

The invention claimed is:

1. A method for producing a solid electrolytic capacitor which comprises forming a dielectric layer on an anode body comprising a valve-acting metal sintered body having fine pores and forming a cathode comprising a conductive compound layer on the dielectric layer,
    wherein said step of forming the cathode comprises repeating a step of laminating the conductive compound layer on the dielectric formed on the anode body, which laminating step comprises dipping a part of the anode body to a predetermined depth into one of an inorganic compound solution, an organic compound solution or a conductive-polymer compound dispersion liquid, removing the anode body from the solution or dispersion to leave a liquid film on the anode body and drying the liquid film to form the conductive compound layer on the anode body to the predetermined depth, and
    increasing a depth that the anode body is dipped in the solution or dispersion liquid with each dipping,
    to thereby produce the solid electrolytic capacitor.

2. The method for producing the solid electrolytic capacitor as claimed in claim 1, wherein the average diameter of fine pores of the valve-acting metal sintered body is 0.5 μm or less.

3. The method for producing the solid electrolytic capacitor as claimed in claim 1, wherein each dipping in the solution or dispersion liquid is carried out for a time sufficient for the solution or dispersion liquid to penetrate inside the valve-acting metal sintered body by capillary action.

4. The method for producing the solid electrolytic capacitor as claimed in claim 3, wherein the time of each dipping in the solution or dispersion liquid is from one to ten minutes.

5. The method for producing the solid electrolytic capacitor as claimed in claim 1, which comprises forming the cathode by repeating the step of dipping the anode body in the solution or dispersion liquid under reduced pressure and subsequent heat decomposition or drying.

6. The method for producing the solid electrolytic capacitor as claimed in claim 1, which comprises forming the cathode by repeating the step of dipping the anode body in the solution or dispersion liquid under atmospheric pressure and subsequent heat decomposition or drying.

7. The method for producing the solid electrolytic capacitor as claimed in claim 1, wherein the valve-acting sintered body is a sintered body of powder selected from tantalum powder, niobium powder, alloy powder mainly comprising tantalum, alloy powder mainly comprising niobium and niobium monoxide powder.

8. The method for producing the solid electrolytic capacitor as claimed in claim 1, wherein the predetermined depth is 10% of a total height of the electrolytic capacitor.

* * * * *